(12) United States Patent
Otaigbe et al.

(10) Patent No.: US 6,533,563 B1
(45) Date of Patent: Mar. 18, 2003

(54) ATOMIZING APPARATUS FOR MAKING POLYMER AND METAL POWDERS AND WHISKERS

(75) Inventors: Joshua U. Otaigbe, Ames, IA (US); Jon M. McAvoy, Moline, IL (US); Iver E. Anderson, Ames, IA (US); Jason Ting, Ames, IA (US); Jia Mi, Pittsburgh, PA (US); Robert Terpstra, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 09/640,431

(22) Filed: Aug. 17, 2000

Related U.S. Application Data

(62) Division of application No. 08/895,645, filed on Jul. 17, 1997, now Pat. No. 6,171,433.
(60) Provisional application No. 60/022,112, filed on Jul. 17, 1996.

(51) Int. Cl.[7] .................................................. B29B 9/10
(52) U.S. Cl. ................................ 425/6; 425/7; 425/10; 264/12; 264/14; 159/4.4
(58) Field of Search ....................... 425/6, 10, 7; 264/9, 264/14, 12; 159/4.4, 48.1

(56) References Cited

U.S. PATENT DOCUMENTS

| | | | |
|---|---|---|---|
| 2,206,058 A | 7/1940 | Slayter et al. ................. 65/464 |
| 2,336,745 A | 12/1943 | Manning .......................... 18/8 |
| 2,382,290 A | 8/1945 | Callander et al. .............. 65/447 |
| 2,437,263 A | 3/1948 | Manning .......................... 18/8 |
| 2,508,462 A | 5/1950 | Marshall .......................... 18/8 |
| 2,673,121 A | 3/1954 | Brennan ..................... 299/28.8 |
| 2,810,426 A | 10/1957 | Till et al. .................... 264/438 |
| 2,862,242 A | 12/1958 | Jones et al. .................. 18/47.3 |
| 3,004,719 A | 10/1961 | Pouppirt et al. ............. 239/381 |
| 3,015,449 A | 1/1962 | Meyer ........................ 239/417 |
| 3,117,055 A | 1/1964 | Guandique et al. ......... 161/170 |
| 3,166,613 A | 1/1965 | Wright et al. ................. 264/12 |
| 3,338,992 A | 8/1967 | Kinney ......................... 264/24 |
| 3,502,763 A | 3/1970 | Hartmann .................... 264/210 |
| 3,543,332 A | 12/1970 | Wagner et al. .................... 18/8 |
| 3,607,543 A | 9/1971 | Stevenson et al. .......... 156/306 |
| 4,218,411 A | * 8/1980 | Price et al. ..................... 264/8 |
| 4,296,208 A | * 10/1981 | Gagliani et al. .............. 521/77 |
| 4,619,845 A | 10/1986 | Ayers et al. .................... 239/8 |
| 5,125,574 A | 6/1992 | Anderson et al. ............... 239/8 |
| 5,227,017 A | * 7/1993 | Tanaka et al. .............. 159/48.1 |
| 5,228,620 A | 7/1993 | Anderson et al. ............... 239/8 |
| 5,277,705 A | 1/1994 | Anderson et al. ............. 55/319 |
| 5,628,937 A | * 5/1997 | Oliver et al. .................. 425/6 |

* cited by examiner

Primary Examiner—Jan H. Silbaugh
Assistant Examiner—Thu Khanh T. Nguyen

(57) ABSTRACT

Method for making polymer particulates, such as spherical powder and whiskers, by melting a polymer material under conditions to avoid thermal degradation of the polymer material, atomizing the melt using gas jet means in a manner to form atomized droplets, and cooling the droplets to form polymer particulates, which are collected for further processing. Atomization parameters can be controlled to produce polymer particulates with controlled particle shape, particle size, and particle size distribution. For example, atomization parameters can be controlled to produce spherical polymer powders, polymer whiskers, and combinations of spherical powders and whiskers. Atomizing apparatus also is provided for atoomizing polymer and metallic materials.

9 Claims, 7 Drawing Sheets

ATOMIZING APPARATUS FOR MAKING POLYMER AND METAL POWDERS AND WHISKERS

This is a division of Ser. No. 08/895,645 filed Jul. 17, 1997, now U.S. Pat. No. 6,171,433, and claims benefits of provisional application Ser. No. 60/022,112 filed on Jul. 17, 1996.

CONTRACTURAL ORIGIN OF THE INVENTION

The U.S. Government has rights in the invention pursuant to Contract No. W-7405-ENG-82 between the U.S. Department of Energy and Iowa State University, Ames, Iowa, which contract grants to Iowa State University Research Foundation, Inc. the right to apply for this patent.

FIELD OF THE INVENTION

The present invention relates to a method for atomizing molten polymeric materials to produce fine polymer particulates and to the polymer particulates, such as polymer spherical powders, fibers and whiskers, formed by such atomization and to atomizing apparatus for polymers, metallic and other materials.

BACKGROUND OF THE INVENTION

Presently, commercial synthetic organic polymer powders are made by grinding of extruded polymer pellets often under cryogenic temperature conditions. Grinding is undesireable as a result of being highly energy-intensive and sensitive to contamination from the grinding equipment used and from environmental pollution. Due to the erratic nature of the grinding process, it is practically impossible to controlling quality, particle size, and distribution of polymer powders. Ball milling of extruded polymer pellets also suffers from similar problems.

Some polymer materials, such as ultra-low molecular weight polyethylene, cannot even be ground or ball milled to form particulates as a result of their waxy nature.

An object of the present invention is to provide a method for making polymer particulates from polymer materials in a manner that overcomes the aforementioned problems heretofore associated with grinding or ball milling to produce commercial polymer powders.

Another object of the present invention is to provide a method for making polymer particulates from polymer materials that heretofore could not be ground or ball milled to particulate form.

Still another object of the present invention is to provide a method for making polymer particulates by gas atomizing molten polymeric material in a manner to provide controlled particle shape, particle size and particle size distribution.

Still a further object of the present invention is to provide a method for gas atomizing molten polymeric material to form polymer particulates without the need for the addition of flow modifiers, such as oils and greases or molybdenum disulfide, to the polymer material to lower viscosity.

Still an additional object of the present invention is to provide atomized polymer particulates with particle shape, particle size and particle size distribution controlled as desired.

Another object of the present invention is to provide atomized polymer particulates which heretofore could not be produced on a mass-production basis by grinding or ball milling of extruded material.

Still a further object of the present invention is to provide atomized polymer particulates of improved quality with reduced contamination from flow modifiers and other additives heretofore used.

A further object of the invention is to provide improved atomizing apparatus for gas atomizing fluid polymer materials, inorganic materials, metallic materials and others.

SUMMARY OF THE INVENTION

The present invention involves a method for making polymer particulates by providing a fluid (e.g. molten) polymer material, which may include virgin polymer material and/or recycled polymer waste material, under conditions to avoid thermal degradation of the polymer material, atomizing the melt using gas jet means in a manner to form atomized droplets, and treating (e.g. cooling) the droplets to form solid polymer particulates, which are collected for further processing. Certain atomization parameters can be controlled for a given polymer material to produce polymer particulates with controlled particle shape, particle size, and particle size distribution. For example, atomization parameters can be controlled to produce polymer spheres, polymer fibers or whiskers, and combinations thereof.

In an illustrative embodiment of the present invention, polymer material is heated in a melting vessel to an atomization temperature under an inert or other non-reactive gaseous atmosphere effective to increase the thermal degradation temperature of the polymer material. The gaseous atmosphere is used to raise the thermal degradation temperature of the polymer melt. The atomization temperature is selected to be between the polymer melting temperature and the raised thermal degradation temperature so as to avoid polymer thermal degradation at the atomization temperature.

A stream of molten polymer is supplied from the melting vessel to an atomizing nozzle typically by providing gas pressure on the polymer melt in the melting vessel to force it through a melt supply or pour tube to the atomizing nozzle. The polymer stream is supplied to the atomizing nozzle where one or more gas jets are directed at the molten polymer stream to disintegrate it to form fine polymer droplets. The atomized polymer droplets fall by gravity and rapidly cool to form solidified polymer particulates that are collected in a collection chamber below the atomizing nozzle.

The present invention also provides atomized polymer particulates that can comprise spherical polymer powders, polymer fibers or whiskers, and combinations thereof. Spherical polymer particulates can be atomized in the size range of about 200 microns or less mean particle size. Spherical particles in the size range of about 5 to about 200 microns diameter are especially useful as a product powder of the invention for a wide variety of commercial applications, such as paint additives, sprayable coating materials and the like. Fiber or whisker shaped polymer particulates having a diameter of 30 microns or less and length of about 1 millimeter to 1 centimeter also can be produced by the invention. Semicrystalline and/or amorphous polymer particulates can be made by the atomization method.

The present invention is advantageous in that polymer particulates can be made from polymers which heretofore could not be ground or ball milled to this end due to their waxy nature. Moreover, polymer particulates can be made with controlled particle shape, particle size and particle size distribution without the need for the addition of flow modifiers, such as oils and greases or molybdenum disulfide, to the polymer material to lower viscosity and with reduced energy consumption compared to grinding and ball milling. As a result, atomized polymer particulates can be made having improved quality with reduced contamination. Polymer particulates can be made from virgin polymer materials and/or recycled polymer waste materials.

The present invention also involves atomizing apparatus comprising means for discharging atomizing gas and a supply tube for molten material to be atomized by the atomizing gas wherein the supply tube includes a discharge end positioned proximate the atomizing gas and having a plurality of channels for improving distribution of the molten material toward the atomizing gas for atomization thereby in a manner to control particle size, particle shape and particle size distribution. The atomizing apparatus can be used to atomize polymer materials, inorganic materials, metals and alloys, and other molten or liquid materials.

The above objects and advantages of the present invention will become more readily apparent from the following detailed description taken with the following drawings.

DESCRPITION OF THE DRAWINGS

FIG. 1 is a schematic view of apparatus for carrying out an embodiment of the method of the present invention for making polymer particulates.

FIG. 2 is a perspective view of the apparatus for carrying out an embodiment of the method of the present invention for making polymer particulates.

FIG. 3 is a schematic, sectional view of a polymer melting crucible and melt pour tube.

FIG. 4 is a partial sectional view illustrating a high pressure gas atomizing nozzle beneath the crucible and receiving the pour tube for atomizing a molten polymer stream exiting from the pour tube.

FIG. 5A is a photograph of a polymer melt stream exiting the pour tube before atomization.

FIG. 5B is a photograph of the polymer melt stream exiting the pour tube after atomization.

FIG. 6A is a photomicrograph of atomized generally spherical polyethylene base (Hoechst-Celanese PE-130) polymer particles with some whisker shaped particles present made pursuant to the invention.

FIG. 6B is a photomicrograph of commercially ground polymer particles having faceted, angular surfaces for comparison purposes.

FIG. 7A is partial sectional view of a bottom end of a pour tube having radial channels machined therein and FIG. 7B is an enlarged end view of the bottom end of the pour tube of FIG. 7A.

DETAILED DESCRIPTION OF THE INVENTION

FIG. 1 schematically illustrates an embodiment of the present invention for making polymer particulates wherein apparatus is used including a melting zone M where the polymer is melted in a melting vessel or crucible 10, an atomization or disintegration zone or chamber A in the form a drop tube where the polymer melt is atomized as a spray of droplets and solidified, and a collection zone C having a hopper CH for directing the solidified atomized polymer particulates into a collection chamber CC. A support frame F having steel floor pads P is provided to support the apparatus on the floor.

In stage 1 of a method embodiment illustrated in FIG. 1, the meltable organic polymer is initally placed in the crucible 10 in the form of-solid polymer pellets or irregular chunks and heated to above the melting temperature of the polymer under an inert or other atmosphere that is selected to increase the polymer thermal degradation temperature. The polymer pellets and chunks can comprise virgin polymer material and/or recycled waste polymer material from a recycling faciltiy. Positive nitrogen (or other gas) gas pressure is used in stage 2 to transport the molten polymer to atomization stage 3 where the molten polymer is disintegrated into submicron size droplets by atomizing nozzle 30 of the type described in U.S. Pat. No. 5,228,620, the teachings of which are incorporated herein by reference. For melting and transport of high melting temperature aromatic polymers, such as ultra high molecular weight polyethylene (UHMWPE), Polyphenylene oxide, polyphenylene sulfide, and polystyrene, that have high viscosities, an auger screw feed system (not shown) with controlled heating zones can be used to feed molten polymer to atomization stage 3. The atomization chamber A can be contructed of crystal clear polycarbonate (e.g. Lexan polycarbonate) to allow real-time observation of the disintegration process. If generally spherical powders are the desired particulates to be produced, high energy disintegration of the polymer melt is effected by using high atomizing gas pressures in the range of 800–1100 psi for polyethylene and like polymers. Lower atomizing gas pressures in the range of 300–800 psi can be used for making polymer fiber or whisker shaped particles by a lower energy disintegration mechanism. The atomized polymer droplets are allowed to drop under force of gravity of their own weight in chamber A and under the influence of the expanding high-pressure gas into the collection chamber CC. The solidified atomized polymer particulates can be collected from the collection chamber for further porcessing, which may include size classification by sieving, pneumatic size classification or hydraulic size classification, and packaging, densification/compaction.

Referring to FIGS. 2, 3, and 4, the invention provides a high yield method for making polymer particulates that involves melting of the polymer in a crucible 10 under a controlled inert gas atmosphere that is selected to increase the polymer thermal degradation temperature. The crucible 10 comprises a 3 inch in diameter by 10 inches long by 0.25 inch thick cylindrical pipe 10*b* and a 0.20–0.25 inch thick stainless steel base plate, 10*a* welded to the end of the pipe 10*b*. A ¾ inch tapped hole is provided in the center of the base plate 10*a*. A stainless steel pour tube 12 is threaded into the tapped hole in the base plate 10*a*. The other end of the crucible 10 includes two ¼ inch holes therein equipped with NPT hose barb fitting 10*c* for an inlet pressurizing gas (e.g. nitrogen) from a source S1, such as a standard laboratory gas cylinder, and similar fitting 10*d* for outlet gases. The outlet fitting includes a needle shut-off valve 10*e* that leads to an air vent when the needle valve is open. The inlet pressurizing gas is used initally for producing an inert atmosphere relative to the polymer to be melted by displacing oxygen (air) from the crucible 10. The outlet gas fitting 10*d* is connected to the air vent to allow for removal of the displaced oxygen (air) when the needle valve is open.

To apply positive pressure on the molten contents or charge of polymer in the crucible 10, the crucible is fitted with a threaded stainless steel cap 10*f* equipped with a Viton o-ring seal 10*g* located between the cap and crucible end. The cap 10*f* is threaded onto an outer threaded surface of the upper end of the crucible 10 to effect an airtight seal using the o-ring seal 10*g*. The needle valve associated with the outlet 10*d* is closed when the crucible 10 is pressurized.

Three pressure-tight brass feedthroughs 10k are silver soldered to the top of the cap 10f. As shown in FIG. 3, a feedthrough at the center of the cap 10f receives a stainless steel stopper rod 15 that is connected to a conventional pneumatic actuator 15a located above the cap 10f on support frame F and controlled by a solenoid control SC. The other feedthroughs receive a thermocouple T1 and a conventional motorized stir bar 16 with two blades 16a oriented to pump polymer melt toward the bottom of the crucible 10. The stir bar 16 is connected to a conventional 0.13 horsepower electrical motor (not shown) located above the cap 10f on the support frame F.

The polymer is melted in the crucible 10 using an 800 Watt/240 Volt band heater 20 attached by screw clamps, nuts/bolts or other fastening means on an outside of a lower base region of the crucible 10. A thermocouple T2 is provided between the band heater 20 and the crucible 10 and connected by wires W2 to a conventional temperature controller (not shown). The thermocouple T1 is a temperature probe and also is connected by wires W1 to the temperature controller to provide a temperature control system for the band heater 20. A third thermocouple (not shown) can comprise thermocouple wire in the stopper rod 15 to monitor temperature of the melt exiting the crucible 10. The third thermocouple is connected by wires W3 to a separate temperature monitor.

The motorized stir bar 16 having blades 16a is used to stir and homogenize the polymer melt in the crucible 10 and to remove temperature gradients prior to gas atomization. The stir bar 16 is inserted into the polymer melt through one of the brass feedthroughs located on the crucible cap or lid 10f as described above.

Prior to atomization of the polymer melt, premature flow of the polymer melt through the pour tube 12 is prevented by the pneumatically actuated stopper rod 15 that is seated or sealed on a seat 12a of the pour tube 12. To this end, the pour tube 12 includes an enlarged upper end that includes the seat 12a for the stopper rod 15 to prevent the polymer melt from entering the pour tube. A melt supply passage 12b extends through the pour tube such that when the stopper rod 15 is lifted, the melt supply passage 12b allows the polymer melt to flow from the crucible 10 to the atomizing nozzle 30, while keeping the melt at a near constant temperature as a result,of the stainless steel pour tube being a relatively poor thermal conductor. This allows the polymer melt to remain at a near constant temperature without melt freeze-up in the pour tube 12 before it contacts the cold (−90 degrees C.) supersonic atomization gas discharged from the atomizing nozzle apparatus 30.

The polymer melt exits from the passage 12b at the open bottom end 12c of the pour tube 12 and flows radialy outward and contacted by the atomizing gas from the nozzle apparatus 30. The melt supply tube 12b can have an inner diameter of 1/16, 1/8 or 3/16 inch for purposes of illustration and not limitation.

The pour tube 12 can be provided with a flat annular bottom end 12c for radial polymer melt flow from the passage 12b toward the atomizing gas jets from the atomizing apparatus 30. The flat, annular open bottom end 12c extends perpendicular to the longitudinal axis of the pour tube.

Alternately, in accordance with another embodiment of the invention, the open bottom end 12c of the pour tube 12 can have a plurality of radially extending channels or gutters 12d machined therein using a Woodruff cutter for improving distribution of the molten polymer (or other molten or fluid material) as a uniformly distributed, segmented flow toward the atomizing gas jet discharge orifices 30c. In the pour tube embodiment illustrated in FIGS. 7A and 7B, the number of channels 12d (e.g. 20 channels) will be equal to the number of gas jet discharge orifices 30c (e.g. 20 discharge orifices 30c) of the atomizing nozzle apparatus 30. The channels or gutters 12d are rectangular shaped in plan view, FIG. 7B, and scallop shaped (undercut) in cross section view, FIG. 7A, and are spaced circumferentially around the open bottom end 12c to provide space and direction of the polymer melt to flow radially outward and form a thin film as the molten polymer leaves the edge of the bottom end 12c toward the atomizing gas jets from nozzle 30. For purposes of illustration only, the channels or gutters each can have a width dimension of 0.020 inch and a maximum depth dimension (in the axial direction of the pour tube) of 0.078 inch by radial undercut centered on the longitudinal axis of the pour tube 12. Twenty (20) channels are provided about the bottom end of a 0.125 inch inner diameter and 0.325 outer diameter pour tube. In the embodiment illustrated in FIGS. 7A and 7B, the width dimension of the channels 12d preferably should not exceed the diameter of the discharged orifices 30c in order to insure the liquid polymer is directed to the region of maximum gas velocity in the gas flow pattern when aligned with the position of the individual discrete gas jets exiting from orifices 30c. The molten material distribution channels 12d thereby eliminate uncontrolled wandering of the molten material on the flat bottom surface of the bottom end 12c of the pour tube as the material travels radially toward the circumferential edge of the bottom end 12c, such wandering being discovered to result in non-uniform distribution of the molten material on the bottom end 12c where regions can be either starved or overloaded with molten material.

By changing the alignment of the radial gutters 12d relative to the gas jet discharge orifices 30c of nozzle 30, the sphere to fiber ratio of the atomized polymer particulates can be varied, making it possible to optimize the output of microfibers, if desired. The radial gutters 12d are considered aligned with the atomizing gas jets when the twenty (20) gutters 12d are aligned in a common vertical plane with the twenty (20) gas jet discharge orifices 30c of the nozzle 30. The radial gutters 12d are considered out of alignment with the atomizing gas jets when the twenty (20) gutters 12d are offset relative to the respective twenty (20) gas discharge orifices 30c of the nozzle 30 as a result, for example, of the pour tube 12 being rotated or displaced circumferentially relative to the nozzle orifices 30c. Rotation of the pour tube 12 can provide in situ control over the yields of fine and coarse powder and also particle sizes therebetween and can be effected by a suitable pour tube actuator to this end.

In the embodiments of the atomizing nozzle apparatus 30 illustrated, the local ambient pressure on the bottom end 12c of the pour tube 12 is lower than that on the top of the melt in the crucible. The pressure differential ensures that the liquid melt will be drawn down to the atomizing zone of the nozzle 30. The low pressure zone at the bottom surface of end 12c encourages gas recirculation wherein the gas flowing from the orifices 30c reverses its downward flow direction to flow upwards along the center axis of the nozzle 30 toward the melt exit opening of passage 12b on the bottom surface of pour tube end 12c. The recirculating gas then turns and flows radially parallel to the bottom surface of the-pour tube end 12c. The gas recirculation forces the liquid polymer to flow radially on the bottom surface or in channels 12d towards the circumferential edge of the end 12c in a manner to promote filming of the liquid melt, which filimg facilitates the action of the high velocity gas flowing to cause film instabilites and atomization of the melt into droplets.

Use of the pour tube channels 12d provides a uniform melt thickness for such atomization and provides spatial control over the local gas-to-melt ratio for uniform gas atomizaton of the melt. Thus, a uniform and narrow particle size distrbution of polymer powder (and also metallic powder) can be achieved by practice of this embodiment of the invention to this end.

The pour tube 12 is disposed on a aluminum plate 11 that is positioned on support frame F and separates the melting zone M from the atomization zone or chamber A. Multiple ceramic washers 11a are disposed between the crucible and the plate 11 to reduce heat loss from the crucible.

To charge the crucible, the solid polymer material to be atomized is placed in the crucible 10 after removal from the plate 11 and with the cap 10f removed from the crucible. The stopper rod 15 is engaged on the pour tube seat 12a and the pour tube 12 is screwed on the crucible at this time. The crucible with solid polymer charge therein then is positioned back on the plate 11, and the cap 10f is screwed thereon in provide an air-tight seal. The stopper rod 15 is connected to its pneumatic actuator, and the stir bar 16 is connected to its drive motor. The nitrogen inlet and outlet gas conduits are connected to the fittings 10c, 10d.

In a typical exemplary heating sequence (stage 1), the band heater 20 is set to 150 degrees C. for polyethylene based polymers described below in the Examples (or other heater setting for other different polymers to be melted) and the temperature controller connected to thermocouples T1, T2 is programed to heat the polymer material in the crucible 10 at a rate of 10 degrees per minute to near the polymer melting temperature for the polyethylene based polymers (or other heating rate for other different polymers to be melted). The polymer melt is allowed to remain near the polymer melting temperature for about 30 minutes. The stir bar 16 then is turned on to aid in the melting of the polymer material. The crucible pressurizing gas is turned on and allowed to run from source S1 into the crucible for about 5 minutes in order to displace any oxygen (air) in the crucible, thereby creating an inert or non-reactive atmosphere therein.

The band heater temperature then is increased to approximately 200 degrees and is allowed to remain at this temperature for 30 minutes for polyethylene based polymers described below (or other heating conditions depending on the particular polymer to be melted). After 30 minutes, the band heater temperature is inceased to a temperature near 260 degrees C. (or other temperature depending on the particular polymer to be melted) and remains there until the polymer material melt in the crucible reaches the selected atomization temperature.

Once the polymer melt reaches the selected atomization temperature, the stopper rod 15 is pressured by its pneumatic actuator to seal on the pour tube seat 12a. Then, the atomization gas is supplied from the 6000 psi nitrogen canister or other source S2 to the atomizing nozzle 30 via conventional dome regulator R1, pneumatic high pressure valve VV and high pressure stainless steel gas line L2. The dome regulator itself is pressurized from another high pressure source S3 to provide a dome diaphragm pressure that is adjusted via a high pressure hand regulator R2 to correspond to the atomization gas pressure.

The crucible 10 is pressurized (e.g. about 15 psi) with nitrogen or other pressurizing gas via a flexible rubber low pressure gas line L1 typically from the same source S1 used to initally displace oxygen from the crucible.

Once the crucible is pressurized, the stopper rod 15 is lifted from the pour tube seat 12a, and the molten polymer is forced in stage 2 by the prevailing crucible gas pressure through the pour tube 12 for atomization in stage 3 by the atomizing nozzle 30 shown in FIG. 4. Ultra-high purity (99.99% purity) nitrogen, helium, or other atomizing gas is turned on via valve VV once initial the initial polymer melt flow starts from the atomizing nozzle 30, FIG. 5a.

The atomizing nozzle 30 is of the close-coupled, discrete jet type described in U.S. Pat. No. 5,228,620 (e.g. Example 2 thereof), the teachings of which are incorporated herein by reference to this end. The atomizing nozzle 30 is attached to the plate 11 by multiple screws SS. The atomizing nozzle includes a nozzle body 30a having a bore 30b that receives the pour tube 12 and a plurality of gas jet discharge orifices 30c (e.g. 20 gas jet discharge orifices with a diameter of 0.0292 inch) through which supersonic nitrogen atomizing gas is discharged at the flow of polymer melt from the pour tube 12. The nozzle body includes a gas inlet manifold 30d having dimensions described in Example 2 of U.S. Pat. No. 5,228,620 for receiving the atomizing gas from a line L2 leading to a atomizing gas source S2, such as the 6000 psi nitrogen canister, and supplying it to the orifces 30c.

The present invention is not limited to the particular atomizing nozzle 30 described hereabove and shown in the drawings and can be practiced using other types of gas atomizing nozzles such as discrete gas jet nozzles, converging/diverging gas jet nozzles, close-coupled annular slit nozzles, and the like.

Upon contact with the atomization gas, the molten polymer is atomized in stage 3 into a spray of fine droplets, FIG. 5b. These droplets are subsequently cooled in air in the atomization chamber A, which is 2 feet by 2 feet in cross-section and 6 feet in length. The droplets solidify and fall of their own weight in chamber A in stage 5 and then fall into the collection chamber CC in stage 6 as fine polymer particles whose shape, size and size distribution depends on the nature of the polymer atomized and the atomizing conditions used. The collection chamber CC rests on the floor and is constructed of sheet metal with an outlet OT for the atomization gas to exit. The collection chamber CC includes an internal dividing wall W that acts as a baffle for the atomization gas and also a collection baffle for separation of the small polymer particles which are entrained in the gas stream.

The temperature range in which a polymer material can be atomized pursuant to the invention is determined by the temperature at which the polymer thermally degrades. Degradation occurs when the chains of the polymer molecule break and begin to disassociate, thus resulting in possible hazardous material conditions. During degradation, fumes may be emitted along with possibility of the material ignition.

Pursuant to the invention, heating of the polymer material in the crucible 10 is conducted in an atmosphere inert or non-reactive to the polymer in order to increase the degradation temperature as compared to the thermal degradation temperature of the same polymer material when heated in ambient air where oxygen can react with the polymer. With respect to polyethylnene and other common polymers in widespread use, a nitrogen gas atmosphere can be used to increase the thermal degradation temperature in the crucible 10 and also to force the polymer melt through the pour tube 12 for atomization. The invention is not limited to nitrogen gas for these purposes since other gases, such as inert gases (Ar/He), can be used to these ends.

In practicing the invention, the melting temperature of the polymer material corresponds to the temperature at which a sample of the material undergoes an endothermic reaction in thermogravimetric/differential thermal (TG/DTA) analysis. The initial thermal degradation temperature is considered to be the temperature at which the polymer material first experiences a decrease in mass due to thermal degradation. The thermal degradation temperature is the temperature at temperature above the melting temperature $T_m$ at a constant shear rate to the crystallization temperature where viscosity of the sample sharply increases.

The Table below sets forth $T_g$, $T_m$, $T_c$, initial degradation temperature in inert gas and in compressed air, and degradation temperature determined for PE130 and PE520 polyethylene based polymers (available from, Hoechst-Celanese) atomized in the Examples set forth below.

TABLE

The thermal data obtained from TG/DTA, DSC, and the ParPhysica Rheometer

| Material | $T_g^1$ (° C.) | $T_m^2$ (° C.) | $T_c$ Physica (° C.) | $T_c$ DSC (° C.) | Initial Degradation Temperature: Inert Atmosphere[3] (° C.) | Initial Degradation Temperature: Compressed Air[4] (° C.) | Degradation Temperature (° C.) |
|---|---|---|---|---|---|---|---|
| PE 130 | −112 | 125 | 100 | 120 | 200 | 200 | 460 |
| PE 520 | −109 | 120 | 105 | 115 | 220 | 200 | 460 |

[1]The glass transition temperature was found by DSC.
[2]The melt temperature was found by both TG/DTA and DSC.
[3]Nitrogen was used as the inert gas at a flow rate of 200 ml/min.
[4]Compressed air was used at a flow rate of 200 ml/min to determine the effects of oxidation.

which the polymer material shows a 50% decrease in mass in TG/DTA analysis.

For some polymers, the thermal degradation temperature occurs shortly after the initial thermal degradation temperature (i.e. within 100 degrees C.), while for others it may be much later (e.g. 250 degrees C.). This information is useful to determine the temperature range in which a polymer material can be gas atomized pursuant to the invention. Typically, polymer materials are atomized pursuant to the invention at temperatures approaching the initial thermal degradation temperature, depending upon the type of particulate product desired, however.

Knowledge of the thermal properties of the polymer material is useful in characterizing a polymer material for specific atomizing conditions pursuant to the invention. For example, it is known that linear polyethylene has a sharp melt point with 70% of the crystallinity within the polymer disappearing in a 3–4 degree C. interval, while branched polyethylene melts over a wide temperature range with 60% of its crystallinity disappearing over a 40 degree C. interval. An advantage of using the TG/DTA analysis to characterize the polymer to be atomized is that it has the capability of heating the material under both atmospheric and inert gas conditions that is helpful in determining temperature effects of oxidation on the particular heated polymer, since for many polymer materials, oxidation leads to degradation.

Information obtained from differential scanning calorimetry (DSC) also is useful to determine the glass transition temperature $T_g$, the melting temperature $T_m$, the degradation temperature, and the crystallization temperature $T_c$ of the polymer material to be atomized.

By knowing the heat of crystallization upon cooliing (the area under the DSC curve for crystallization exotherm peak) and comparing the area to that of a 100% crystalline sample, the percent of crystallinity of a polymer sample can be determined. Knowledge of the crystallization temperature $T_c$ helps in practicing the invention to insure-that the polymer melt does not solidify in the pour tube 12 prior to atomization and can be determined using a commercially available ParPhysica Rheometer by cooling a polymer sample at a In general, in practicing the invention, atomization parameters can be controlled to produce desired atomization results. For example, the atomization gas pressure greatly affects the atomization results in that at low atomization gas pressure, the shear induced by the gas jets on the molten polymer material exiting from the pour tube 12 may not be enough to completely overcome the internal stresses within the polymer mateiral. Hence, elongated spheroids or fibers or whiskers can be formed, rather than spherical particles. The atomization gas pressure can be inceased to increase the percentage of atomized spherical particles versus atomized fiber or whisker particles for example.

The temperature of the polymer melt also exerts a large influence on the atomization results. For example, there exists a temperature window in which a particular polymer material can be atomized, but within this window the resulting particle size distribution of the atomized particles can vary greatly. Temperature of the polymer melt does not appear to affect the shape of the atomized particles, however, but use of the channels 12d on the pour tube 12 does.

Since the viscosity of the polymer melt decreases with increasing temperature, the particle size distribution of the atomized polymer particles will vary with different atomization melt temperatures. Typically for a given polymer material, increasing the polymer melt temperature will produce a narrowing of or unimodal particle size distribution.

The size (e.g. diameter) of the polymer melt stream is determined by the inner diameter of the pour tube 12 and can be controlled to have a direct effect on the particle size distribution of the atomized polymer particulates. Typically for a given polymer material, increasing the pour tube inner diameter will produce a broadening of or bimodal particle size distribution.

In addition, the density, viscosity, molecular weight, elasticity, and surface tension of the polymer material affect the atomization results. The atomization parameters discussed hereabove can be controlled for particular polymer properties to produce desired atomization results. For purposes of illustration only, for a PE 130 polyethylene base polymer described in the Examples below, a maximum yield of atomized particulates was obtained using a 0.125 inch inner diameter pour tube at a polymer melt temperature of 185 to 205 degees C. using a flat bottom pour tube 12. A maximum yield of particles less than 53 microns in size was achieved at 205 degrees C. using a 0.125 inch inner diameter pour tube using a flat bottom pour tube. Particles less than 53 microns in diameter will find widespread commercial use as paint additives, sprayable coating materials, ink additives, cosmetic additives, paper fillers, self-reinforced composites and the like. For PE 520 polyethylene based polymer described in the Examples below, a maximum yield of atomized particulates was obtained using a 0.125 inch inner diameter pour tube at a polymer melt temperature of 205 to 215 degees C. using a flat bottom pour tube. A maximum yield of particles less than 53 microns in size was achieved at 215 degrees C. using a 0.0625 inch inner diameter flat bottom pour tube. By using a 0.125 inch inner diameter gutter bottom pour tube and melt temperature of 220 degrees C., the yield of particles less than 53 microns in size for PE 520 was increased.

EXAMPLES

As mentioned, the shape, size and size distribution of the polymer particulate product of the invention depends on the atomization or processing conditions and the nature of the polymer used. Spherical powder particulates, whiskers or fibers, and a mixture of both can be produced in practice of the invention. Specific examples are described below. Although three grades of commercial polyethylene polymers have been atomized and are described in Examples 1–3, this invention is applicable to other polymers that can be melt-processed at temperatures of 450 degrees C. and below and having suitable melt deformation (elasticity) and flow (viscosity) properties for atomization.

Example 1

The pressure crucible 10 in FIG. 3 was used to heat 125.4 grams of a polyethylene-based material (AC-6) produced by Allied Signal Inc. The AC-6 is an ultra-low molecular weight low density polyethylene. The melt temperature for this material was approximately 103 degrees and the inital degradation temperature in an inert atmosphere, such as nitrogen was 250 degrees C. as determined by differential thermal analysis and thermogravitmetric analysis. The polymer material was heated from room temperature to 144 degrees C. over a 1 hour period. The crucible was pressurized to 20 psi using nitrogen gas to force the molten polymer through the flat bottomed pour tube of ⅛ inch inner diameter. Ultra-high purity (99.99%) nitrogen gas at 300 psi was applied to the molten polymer at the exit of the pour tube. The atomizing time was 10 seconds. The resulting atomized polymer particulates contained a mixture of elongated spheroids trapped in a web of fine fibers. The polymer fiber to polymer spheroid ratio was found to be 2:1. The atomization pressure was enough to form the polymer spheroids, but not high enough to break the elongated polymer spheres away frm the polymer fibers. Due to the entanglement of the elongated spheres and fiber, size classification of the particulate product was not possible.

Example 2

The pressure crucible 10 in FIG. 3 was used to heat 110.2 grams of a polyethylene-based material (AC-6) produced by Allied Signal Inc. The polymer material was heated from room temperature to 195 degrees C. over a 130 minute period. The crucible was pressurized at 15 psi using nitrogen gas to force the polymer through the flat bottomed pour tube of ⅛ inch inner diameter. Ultra-high purity (99.99% purity) nitrogen gas at 900 psi was applied to the molten polymer at the exit of the pour tube. The atomizing time was 20 seconds. Relative to the particulate product of Example 1, the resulting atomized polymer particulates contained more distinct spheres ranging in size from 10–150 microns diameter, and fewer fibers. The ratio of the fibers to the spheroids was found to be 1:1. Some of the spheroids were still entangled in the fibers, but there were fewer fibers than in Example 1, thus making optical classification with the use of a scanning electron microscope possible.

Example 3

The pressure crucible 10 in FIG. 3 was used to heat 297.7 grams of a polyethylene-based material Hoechst Wax PE 130 produced by Hoechst-Celanese Corporation. The Hoechst Wax PE 130 is an ultra-low molecular weight (2000 grams/mole) high density (0.98 grams/cubic centimeters) polyethylene. The polymer material was heated from room temperature to 197 degrees C. over a 65 minute period. The crucible was pressurized to 18 psi using nitrogen gas to force the molten polymer through the flat bottomed pour tube of ⅛ inch inner diameter. Ultra-high purity (99.99% purity) nitrogen gas at 900 psi was applied to the molten polymer at the exit of the pour tube. The atomizing time was 20 seconds. The resulting atomized polymer particulates contained mostly spheres with few fibers attached to larger spheres. The polymer fiber to polymer spheroid ratio was found to be 1:2. Many of the smaller spheres were either attached to larger spheres or were connected to other small spheres to form small agglomerates of spheres. Optical clssification using a scanning electron microscope showed a size distribution similar to that obtained in Example 2. The sizes of the spheres ranged from 10–150 microns diameter, FIG. 6a. The higher density or crystallinity of the PE 130 polymer relative to AC-6 polymer used in examples 1–2 is more advantageous for the production of spheres.

Example 4

Figure 1:
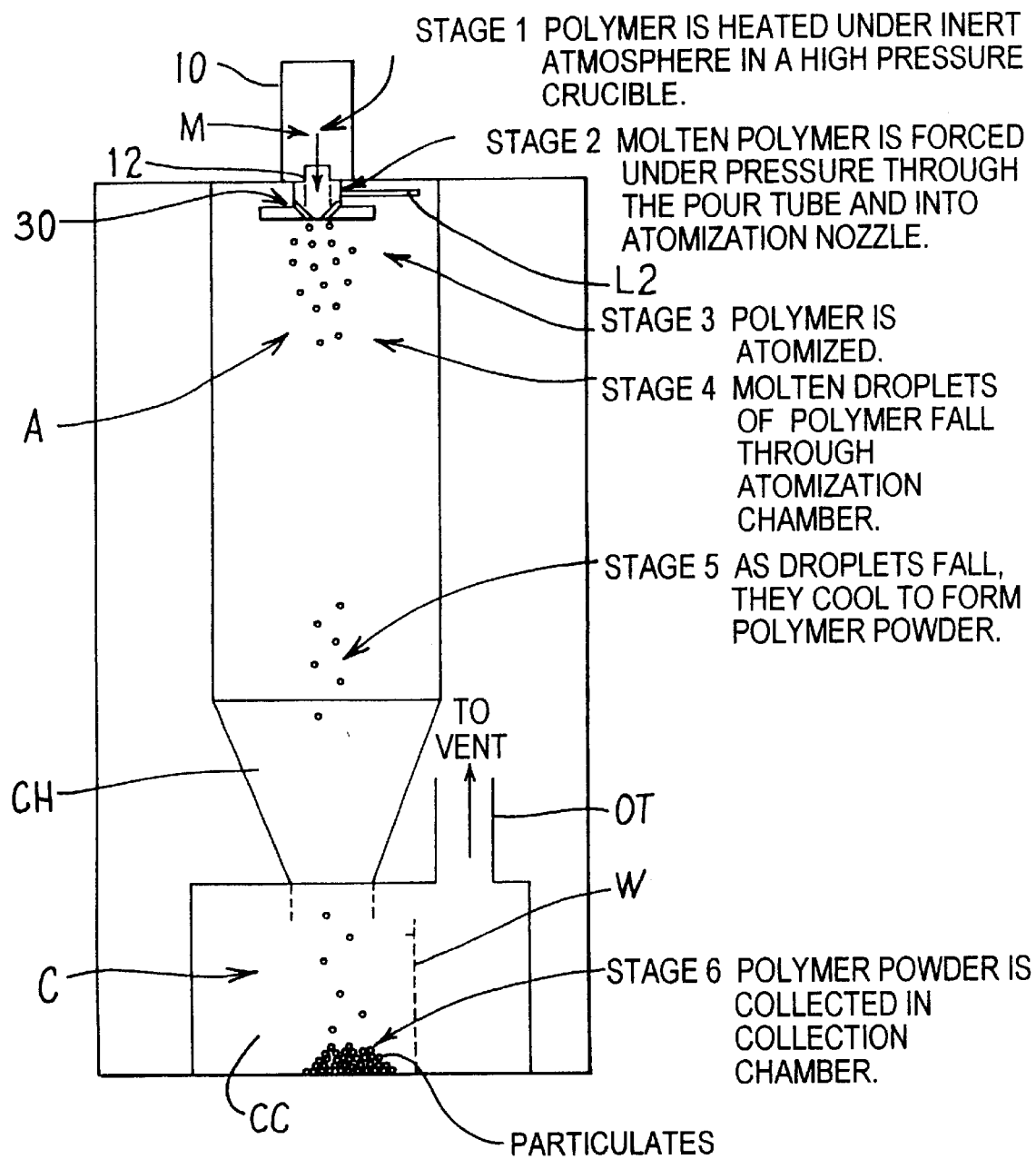
Figure 2:
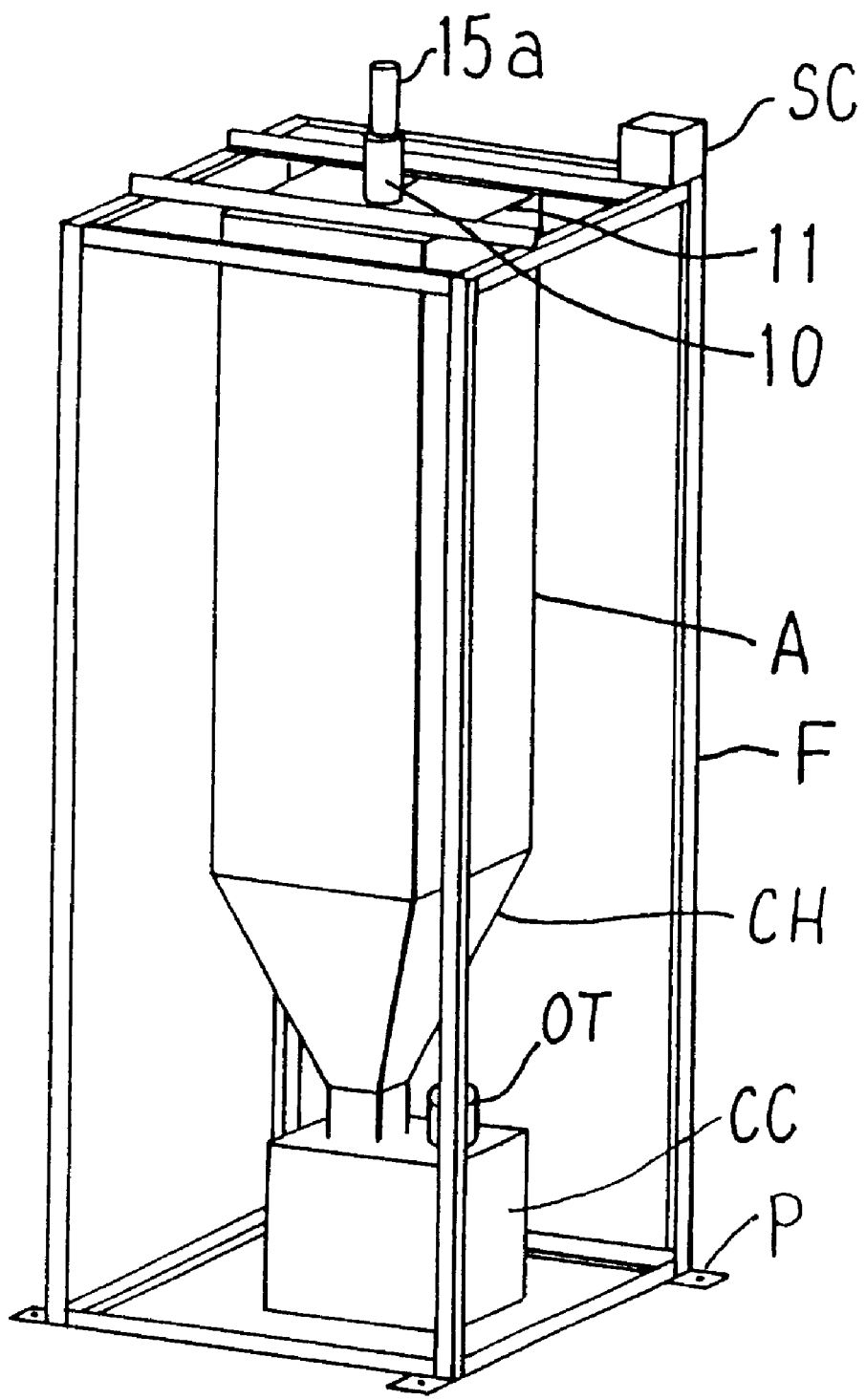
Figure 3:
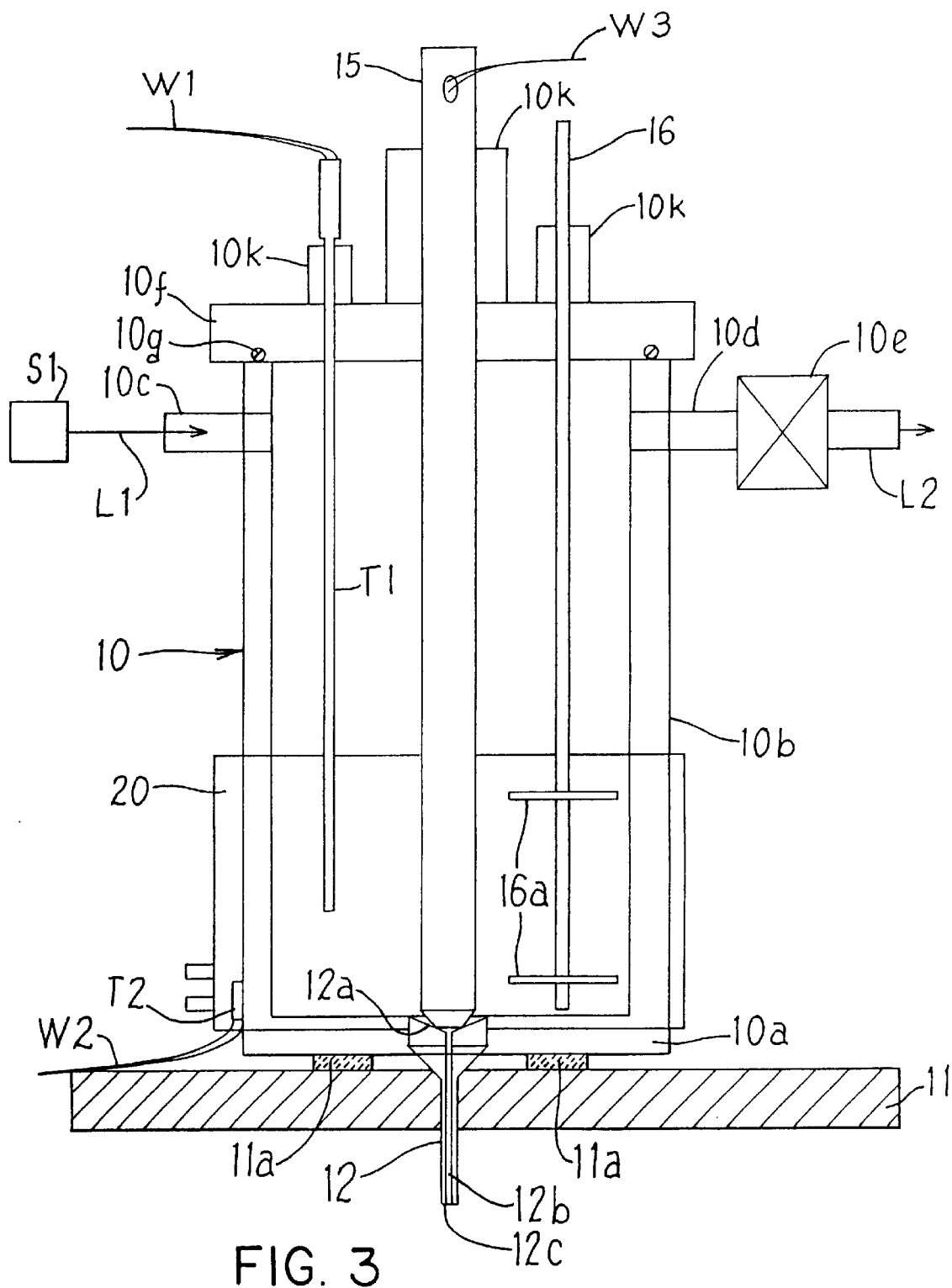
Figure 4:
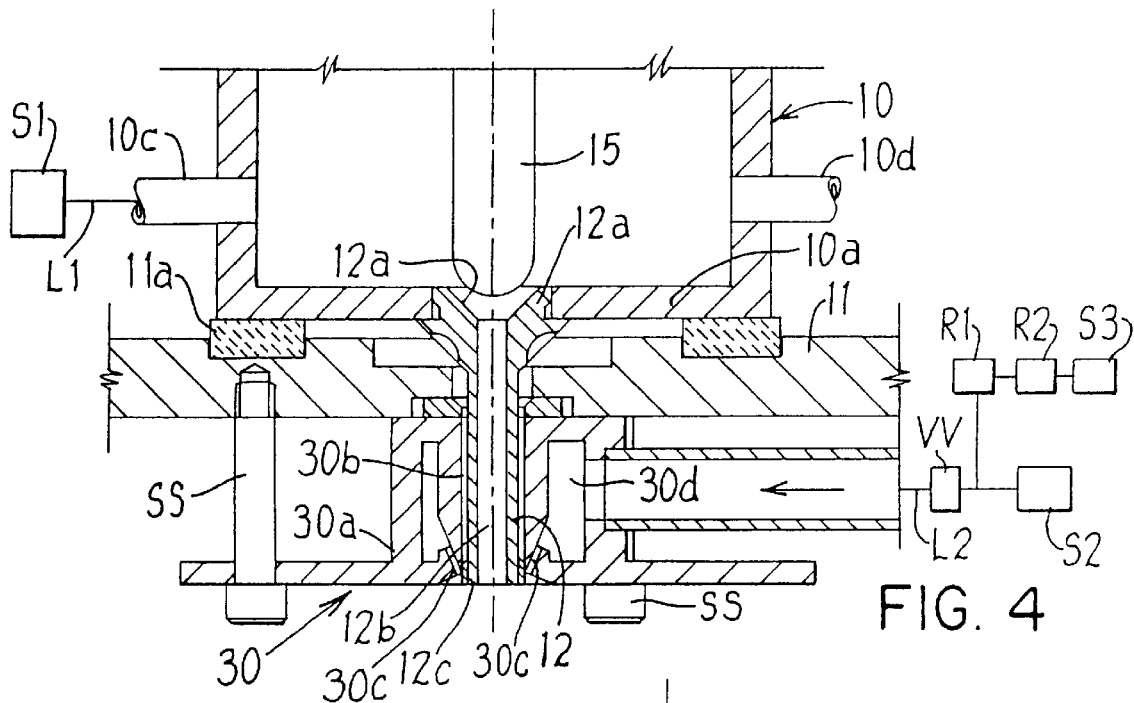
Figure 7A:
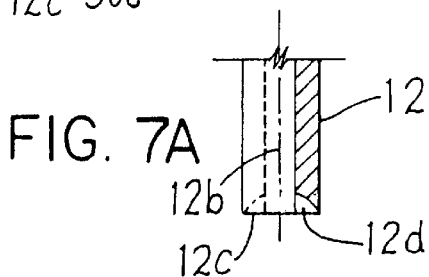
Figure 7B:
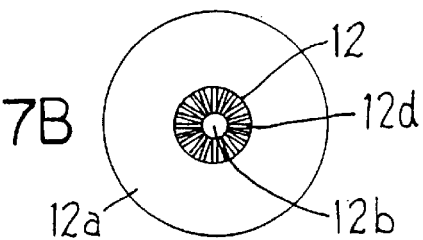
Figure 5A:
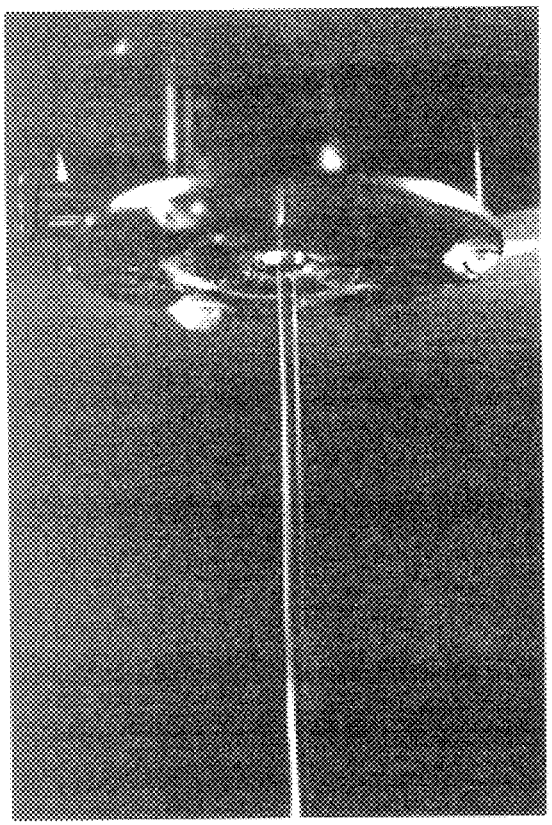
FIGS. 5a and 5b are photographs of molten polymer stream flowing from the atomization nozzle 30 before atomization, FIG. 5a, and during atomization at 1000 psi nitrogen atomizing gas, FIG. 5b, for the Hoeschst PE 130 polymer to illustrate a typical atomization spray pattern.
Figure 5B:
Figure 6A:
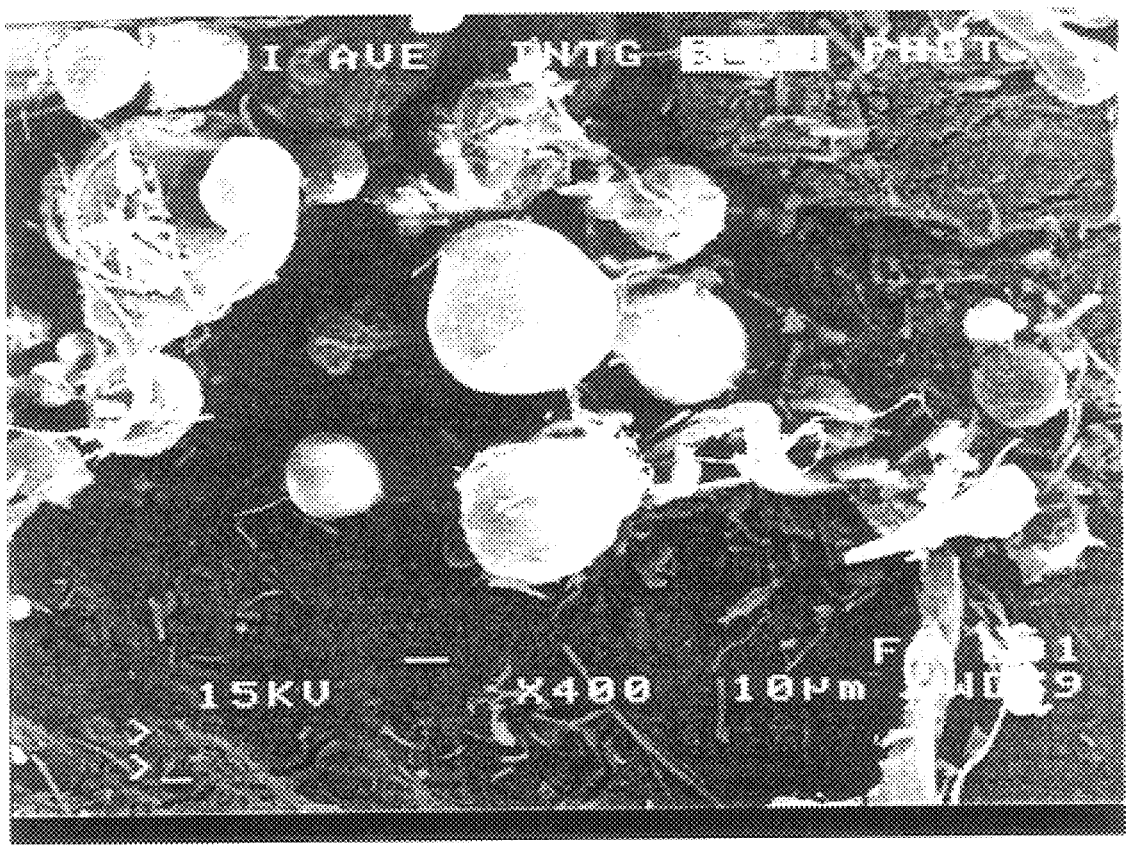
FIG. 6b is a photomicrograph of commercially ground low molecular weight polyethylene-based polymer particles (Acumist AC-18 from Allied Signal Inc.) having irregular faceted, angular surfaces for comparison to FIG. 6a of the low molecular weight Hoechst PE 130 particles pursuant to the invention.
Figure 6B:
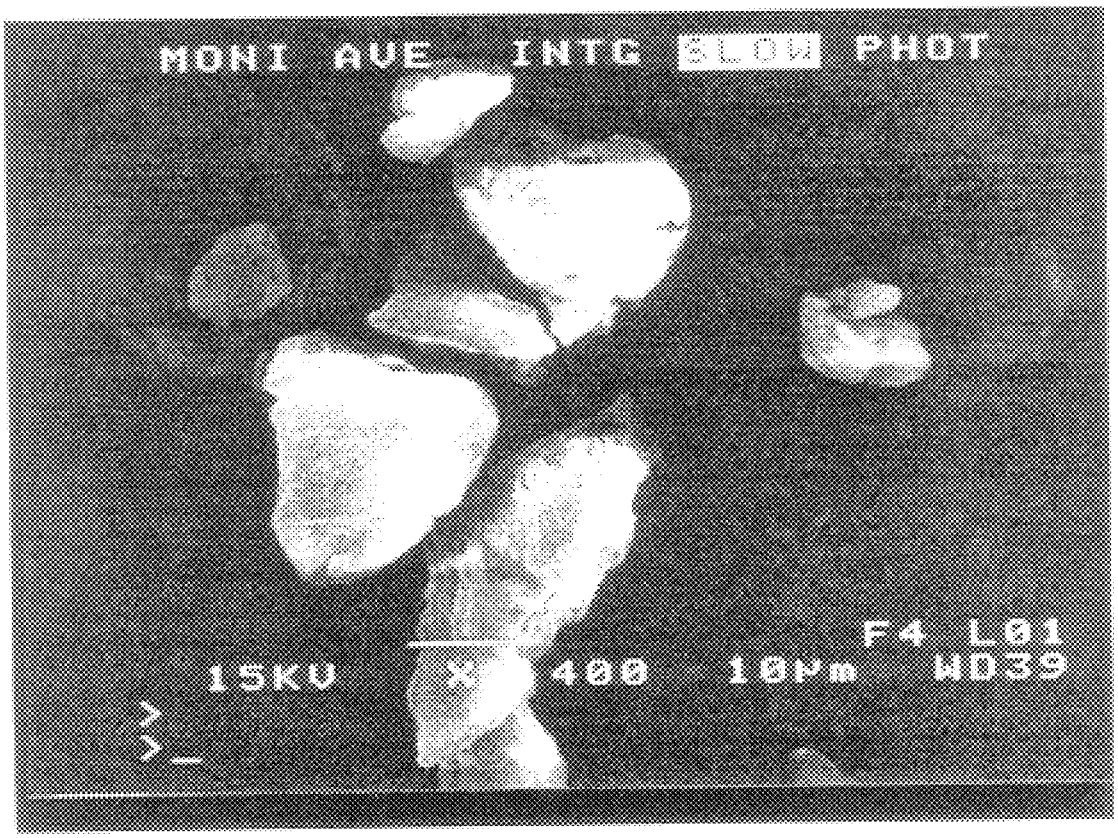

The pressure crucible 10 in FIG. 3 was used to heat 100 grams of a polyethylene-based material Hoechst Wax PE 520 produced by Hoechst-Celanese Corporation. The Hoechst Wax PE 520 is an ultra-low molecular weight (3000 grams/mole) low density (0.93 grams/cubic centimeters) polyethylene. The polymer material was heated from room temperature to 220 degrees C. at a heating rate of 10 degrees C. per minute. The crucible was pressurized to 15 psi using nitrogen gas to force the molten polymer through the pour tube with the 20 radial gutters in alignment with the 20 gas jets of the atomizing nozzle and of ⅛ inch tube inner diameter. Ultra-high purity (99.99% purity) nitrogen gas at 1100 psi was applied to the molten polymer at the exit of the pour tube. The atomizing time was a few seconds. The resulting atomized polymer particulates contained 63% by volume spherical powders and 37% by volume microfiber particles, providing a sphere/fiber ratio of 1.7. The yield of 0–53 micron particle size fraction was about 7% by weight, which was about 0.63 times that obtained using a flat-bottomed pour tube of like inner diameter.

Example 5

The pressure crucible 10 in FIG. 3 was used to heat 100 grams of a polyethylene-based material Hoechst Wax PE 520. The polymer material was heated from room temperature to 220 degrees C. at a heating rate of 10 degrees C. per minute. The crucible was pressurized to 15 psi using nitrogen gas to force the molten polymer through the pour tube with 20 radial gutters set out of alignment with the 20 gas atomizing jets and of ⅛ inch tube inner diameter. Ultra-high purity (99.99% purity) nitrogen gas at 1100 psi was applied to the molten polymer at the exit of the pour tube. The atomizing time was a few seconds. The resulting atomized polymer particulates contained 42% by volume spherical powders and 58% by volume microfiber particles, providing a sphere/fiber ratio of 0.72. The yield of 0–53 micron particle size fraction was about 3.5% by weight, which was about 0.31 times that obtained using a flat-bottomed pour tube of like inner diameter.

For PE 520 material, Examples 4 and 5 show that the alignment of the radial gutters 12d of the pour tube 12 relative to the gas jet orifices 30c of the atomizing nozzle 30 can be used to optimize the yield of the 0–53 micron particle size fraction as well as maximizing either the spherical or fiber morphology of the particulates for specific end use applications.

Example 6

The pressure crucible 10 in FIG. 3 was used to heat 100 grams of a 50/50 by weight blend of PE 130/PE 520 and also separately a blend of PE 130/ultra-low melting point phosphate glass (33.04% $SF_2$-37.28% SnO-5.47% $PbF_2$-24.22% $P_2O_3$ in weight %). The atomizing conditions were similar to those described hereabove for atomizing the pure polymers (non-blended) with the exception that a pour tube having bottom gutters described hereabove was used in lieu of the flat bottomed pour tube (with a pour tube inner diameter of ⅛ inch for the PE 130/PE 520 blend) and (with pour tube inner diameter of 3/16 inch for the PE 130/glass blend at an atomization temperature of 205 degrees C.). The average yield of the PE 130/PE 520 blended particulates was 75.7% of the initial pellet charge in the crucible compared to, 82.1% and 64.8% for the pure PE 130 and PE 520, respectively, atomized under similar conditions using a similar pour tube with gutters. The percent yield of the PE 130/phosphate glass blend was about 73% compared to 63% for the pure PE 130. As is apparent, blending of starting materials gives a unimodal particle size distribution.

Example 7

A graphite pressure crucible 10 (4.5 inch diameter by 8 inch long) in FIG. 3 was used to heat 4.16 kilograms of a copper-8 atomic percent Al alloy. The stopper rod 15 comprises a hard fired closed end alumina tube. The pour tube 12 comprised graphite fabricated with 20 radial slots or channels 12d on the bottom end 12c, each channel machined 0.020 inch in width and 0.085 inch deep with a 0.194 radial undercut centered on the longitudinal axis of the pour tube 12. Other components of the atomizing nozzle 30 are described in aforementioned U.S. Pat. No. 5,228,620 incorporated herein by reference. A secondary cooling gas comprising high purity helium was discharged downstream of the atomizing location. The molten alloy was heated to an atomization pour temperature of 1300 degrees C., and then fed from the crucible without pressurization thereof through the pour tube with the 20 radial gutters in alignment with the 20 gas jets of the atomizing nozzle. Ultra-high purity (99.99% purity) nitrogen gas at 1100 psig was applied to the molten molten alloy exiting the pour tube. The atomizing time was 43 seconds. As the liquid alloy exited the pour tube, a bright and stable ring of bright light radiating from the periphery of the pour tube was established, and a slender profile melt spray of atomized droplets was observed to produce fine atomized alloy powders of particle sizes of 1 to 100 microns.

The present invention is not limited to the particular polymer materials and blends described herebove and can be practiced to atomize a wide variety of polymer materials and blends thereof one with another or with other materials, includng thermoplastics and some grades of thermosetting resins that are sold commercially in the fluid state. The present invention is advantageous in that polymer particulates can be made from polymers which heretofore could not be ground or ball milled to this end due to their waxy nature. Moreover, polymer particulates can be made with controlled particle shape, particle size and particle size distribution without the need for the addition of flow modifiers, such as oils and greases or molybdenum disulfide, to the polymer material to lower viscosity and with reduced energy consumption compared to grinding and ball milling. As a result, atomized polymer particulates can be made having improved quality with reduced contamination, high throughput and fast cycle time. Polymer particulates can be made from virgin polymer materials and/or polymer waste products.

While the invention has been described with respect to certain embodiments thereof, those skilled in the art will understand that it is not intended to be limited thereto and that changes and modifications can be made therein within the scope of the appended claims.

We claim:

1. Atomizing apparatus comprising: means for discharging atomizing gas, and a tube having a supply passage for supplying fluid material to be atomized by the atomizing gas wherein said tube includes an axial discharge end for discharging the fluid material to be atomized by the atomizing gas, said discharge end having a plurality of channels disposed thereon about said supply passage and extending from said supply passage toward a peripheral edge of said discharge end for distributing the fluid material to said peripheral edge toward atomizing gas flowing past said peripheral edge for atomization.

2. The apparatus of claim 1 wherein the channels are circumferentially spaced on said discharge end.

3. The apparatus of claim 1 wherein the channels are aligned with discrete gas jets of said means.

4. The apparatus of claim 1 wherein the channels are offset relative to discrete gas jets of said means.

5. The apparatus of claim 1 wherein said means comprises a plurality of gas jet discharge orifices and said channels are equal in number to the number of said orifices.

6. The apparatus of claim 1 wherein each channel extends radially outwardly from said supply passage.

7. The apparatus of claim 1 wherein each channel is scalloped when viewed in cross-section.

8. The apparatus of claim 1 wherein each channel has a rectangular configuration when viewed in plan.

9. The apparatus of claim 1 wherein said channels extend from said supply passage and terminate at said peripheral edge of said discharge end.

* * * * *